(12) United States Patent
Nambiar et al.

(10) Patent No.: US 8,209,244 B2
(45) Date of Patent: Jun. 26, 2012

(54) DOCUMENT MANAGEMENT SYSTEM

(75) Inventors: Shibhu Nambiar, Springfield, VA (US); Suman Guha, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 138 days.

(21) Appl. No.: 12/707,415

(22) Filed: Feb. 17, 2010

(65) Prior Publication Data
US 2011/0202437 A1 Aug. 18, 2011

(51) Int. Cl.
*G07F 19/00* (2006.01)
*H04M 15/00* (2006.01)
(52) U.S. Cl. ........................................................ 705/34
(58) Field of Classification Search .......... 5/30; 705/34, 705/30
See application file for complete search history.

(56) References Cited

U.S. PATENT DOCUMENTS

| | | | |
|---|---|---|---|
| 6,539,386 B1 | 3/2003 | Athavale et al. | |
| 7,096,189 B1 | 8/2006 | Srinivasan | |
| 7,206,768 B1 * | 4/2007 | deGroeve et al. | 705/54 |
| 7,516,088 B2 | 4/2009 | Johnson et al. | |
| 2003/0220855 A1 * | 11/2003 | Lam et al. | 705/34 |
| 2005/0091099 A1 * | 4/2005 | Krueger et al. | 705/8 |
| 2005/0197949 A1 * | 9/2005 | Welter et al. | 705/37 |
| 2005/0203808 A1 | 9/2005 | Wittmer et al. | |
| 2006/0074793 A1 * | 4/2006 | Hibbert et al. | 705/38 |
| 2008/0086352 A1 * | 4/2008 | Hibbert et al. | 705/8 |

OTHER PUBLICATIONS

Systemic Problems Require Actions to Improve Efficiency, GAO Reports, Oct. 4, 2005.*
University of Dundee, Caps, "A Guide to Pecos", https://secure.dundee.ac.uk/caps/docs/do/help/pecosguide.doc, pp. 1-117.
University of Wisconsin-Madison, Division of Business Services, "How to Complete a Change Order for an Existing Purchase Order", http://www.bussvc.wisc.edu/howto/purch/Change_Order.html, p. 1.
Institute of Technology, "System Task: Change an existing purchase order" http://web.mit.edu/sapr3/windocs/bpors05m.htm, pp. 1-15.
Kelly Babbit, Perfect Commerce, "Be a corporate Hero" http://www.perfect.com/Open2005/pdf/Kelly%20Babbit%20OSN-Perfect%20Commerce.pdf, pp. 1-31.
Sap, "Enabling Supplier Collaboration with mySAP", http://www.sap.com/solutions/business-suite/srm/pdf/BWP_SupplierEnablement.pdf, pp. 1-20.
National Instruments, "860 Purchase order change request—Buyer Initiated" http://www.ni.com/pdf/misc/us/860v4010.pdf, pp. 1-24, Feb. 1, 2006.

* cited by examiner

*Primary Examiner* — Matthew Gart
*Assistant Examiner* — Seye Iwarere
(74) *Attorney, Agent, or Firm* — Squire, Sanders (US) LLP

(57) ABSTRACT

A computer-readable medium, computer-implemented method, and apparatus are provided. In one embodiment, a change order for a purchasing document is created, and one or more attributes of the change order are modified. Approval of the change order is submitted and approved, and a change type of the change order is determined. When the change type is external, acknowledgment of the change order is requested and a revision number attribute of the purchasing document is incremented. The purchasing document is updated with the change order and the change order is archived.

24 Claims, 11 Drawing Sheets

Change History: 8491

Currency = US Dollar

Actions ▼  View ▼

| Change Order | Description | Resulting Revision | Creation Date | Initiating Party | Initiator | Type | Proposed Amount Change | Amount Changed | Status |
|---|---|---|---|---|---|---|---|---|---|
| 10 | Need by change | | 28-Feb-2008 | Requester | Brown, Ms. Catherine | External | +100.00 | 0.00 | Cancelled |
| 9 | Account changes | | 11-Dec-2007 | Buyer | Kanesiro, Mr. Ade | Internal | 0.00 | 0.00 | Processed |
| 8 | DFF value change | | 03-Sep-2007 | Buyer | Young, Ms. Deepti | Internal | 0.00 | 0.00 | Processed |
| 7 | Cancelled line 3 | 5 | 15-Aug-2007 | Supplier | White, Ms. Anna | External | -7,825.00 | -7,825.00 | Processed |
| 6 | Price changed | 4 | 29-Jun-2007 | Supplier | White, Ms. Anna | External | +6,943.00 | +6,943.00 | Processed |
| 5 | Quantity changed | 3 | 19-Apr-2007 | Requester | Brown, Ms. Catherine | External | +697.00 | +697.00 | Processed |
| 4 | Amount changed | 2 | 05-Mar-2007 | Buyer | Indus, Ms. James | External | +5,880.00 | +5,880.00 | Processed |
| 3 | PO Description | | 30-Nov-2006 | Buyer | Brown, Ms. Catherine | Internal | 0.00 | 0.00 | Processed |
| 2 | Added a line | | 12-Sep-2006 | Buyer | Welch, Mr. Jack | External | +10,000.00 | 0.00 | Cancelled |
| 1 | Added schedule | 1 | 21-Jul-2006 | Buyer | Wadia, Ms. Noori | External | +5,000.00 | +5,000.00 | Processed |

Done

Revision History: 8491
Currency = US Dollar

Actions ▼  View ▼

| Revision | Change Order | Description | Creation Date | Initiating Party | Initiator | Amount Changed |
|---|---|---|---|---|---|---|
| 9 | 12 | Need by changed | 28-Feb-2008 | Requester | Brown, Ms. Catherine | 0.00 |
| 8 | 11 | Terms changed | 11-Dec-2007 | Buyer | Kaneshiro, Mr. Ade | 0.00 |
| 7 | 10 | Contract Terms Changed | 03-Sep-2007 | Buyer | Young, Ms. Deepti | 0.00 |
| 6 | 9 | Canceled line 3 | 15-Aug-2007 | Supplier | White, Ms. Anna | -7,825.00 |
| 5 | 8 | Price changed | 29-Jun-2007 | Supplier | White, Ms. Anna | +6,943.00 |
| 4 | 6 | Quantity changed | 19-Apr-2007 | Requester | Brown, Ms. Catherine | +697.00 |
| 3 | 4 | Amount changed | 05-Mar-2007 | Buyer | Indus, Ms. James | +5,980.00 |
| 2 | 2 | PO Description | 30-Nov-2006 | Buyer | Brown, Ms. Catherine | 0.00 |
| 1 | 1 | Added a line | 12-Sep-2006 | Buyer | Welch, Mr. Jack | +10,000.00 |
| 0 | | | | | | +5,000.00 |

DOCUMENT MANAGEMENT SYSTEM

FIELD

One embodiment is directed to a computer system for managing documents, and more particularly, to a computer system for managing purchasing documents.

BACKGROUND

A purchasing document is a contractually binding document between a buying organization ("buyer") and a selling organization ("supplier"). Generally there can be many types of purchasing documents. For example, a standard purchase order includes a specific product the buyer desires and a delivery date of the specific product desired by the purchaser. Another type of purchasing document, a blanket agreement, may be a long term contract that indicates a particular product, a negotiated price for the particular product, and a particular duration for how long the product may be supplied to the buyer. Yet another type of purchasing document is a contract purchasing agreement. With a contract purchasing agreement, a buyer does not indicate a specific product, but simply indicates that a product is needed in, for example, a given year.

A purchasing document can contain information pertaining to goods and/or services that a buyer commits to buy. For example, a purchasing document can include a specific product the buyer desires, a quantity of the specific product, and a price of the specific product. Attributes such as item, quantity, and price, are relevant to suppliers because these attributes enable suppliers to execute their obligations. These types of attributes on the purchasing document, which are relevant to suppliers, are called "supplier facing attributes."

In addition to supplier facing attributes, a purchasing document also contains attributes that are required for administrative purposes within the buying organization. For example, a purchasing document can include cost centers or projects that fund the purchase, internal delivery instructions, or a set of tolerances and controls to ensure satisfactory order execution. These types of attributes are called "internal control attributes."

Evolving business conditions often necessitate modifications to a purchasing document. A document may undergo multiple modifications during its lifecycle. The scope of the modification may include attributes from both sets: supplier facing attributes and internal control attributes. Modifications to a purchasing document can be categorized into two types: internal changes and external changes. An internal change includes a change to at least one internal control attribute, and does not include any changes to supplier facing attributes. An external change either includes a change to at least one supplier facing attribute, or a change to at least one supplier facing attribute and a change to at least one internal control attribute.

Being a contractually binding document, organizations are required to track changes to supplier facing attributes. Typically, such changes need to be communicated and agreed upon by suppliers before they are made effective. However, even absent any contractual requirements to track modifications that only include changes to internal control attributes, it is also desired to track and keep historical record of modifications that only include changes to internal control attributes. This is true in light of recent laws and regulations (e.g., Sarbanes-Oxley Act), that organizations are mandated to adhere.

SUMMARY

One embodiment is directed to a computer-readable medium having instructions stored thereon that, when executed by a processor, cause the processor to implement a method. The instructions can include creating a change order for a purchasing document and modifying one or more attributes of the change order. The instructions can further include submitting and receiving approval of the change order and determining a change type of the change order. The instructions can further include, when the change type is external, requesting acknowledgment of the change order and incrementing a revision number attribute of the purchasing document. The instructions can further include updating the purchasing document with the change order, and archiving the change order.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 4 illustrates a user interface of a document management system which enables a buyer to view a purchasing document in accordance with one embodiment of the invention.

FIG. 6 illustrates a user interface of a document management system which enables a buyer to edit a change order in accordance with one embodiment of the invention.

FIG. 7 illustrates a user interface of a document management system which enables a supplier to edit a change order in accordance with one embodiment of the invention.

FIG. 8 illustrates a user interface of a document management system which displays change history in accordance with one embodiment of the invention.

FIG. 9 illustrates a user interface of a document management system which displays revision history in accordance with one embodiment of the invention.

FIG. 10 illustrates a user interface of a document management system which enables a buyer to review proposed changes on a change order that corresponds to a purchasing document in accordance with one embodiment of the invention.

FIG. 11 illustrates a user interface of a document management system which enables a supplier to review proposed changes on a change order that corresponds to a purchasing document in accordance with one embodiment of the invention.

DETAILED DESCRIPTION

One embodiment is a document management system that creates a change order which corresponds to a purchasing document that a user proposes to change. A change order is a copy of the purchasing document that can capture proposed changes to the corresponding purchasing document. Because the proposed changes are captured on the change order rather than the purchasing document, the purchasing document can remain unaltered throughout a change order authoring and approval cycle. Thus, the purchasing document is revised only after all change order validations and authorizations are completed. The scope of the change captured on the change order can include changes to supplier facing attributes, changes to internal control attributes, or changes to both supplier facing attributes or internal control attributes. According to an embodiment, a change order is created whenever a purchasing document is updated, even if the scope of the change is limited to internal control attributes.

According to an embodiment, when the document management system processes a change order, the document management system can automatically detect whether a scope of the change to a corresponding purchasing document involves changes to supplier facing attributes, changes to internal control attributes, or changes to both types of attributes. If the scope of the change comprises one or more supplier facing attribute changes, the document management system can follow the following process: submitting the change order and receiving internal approval, communicating the change order to the supplier and requesting acknowledgment from the supplier, incrementing a revision of the corresponding purchasing document, and archiving the change order. If the scope of the change comprises only one or more internal control attribute changes, the document management system can streamline the above process by removing the following steps: communicating the change order to the supplier and requesting acknowledgment from the supplier, and incrementing a revision of the corresponding purchasing document.

Furthermore, according to an embodiment, the document management system can archive each change order created by the system. Therefore, users are able to retrieve an audit trail of prior change orders. According to the embodiment, the document management system can also filter a view of prior change orders. Therefore, a buyer can view all change orders created for a purchasing document, including change orders that only involve internal control attribute changes, whereas a supplier can only view changes orders that contain at least one supplier facing attribute change.

Figure 1:
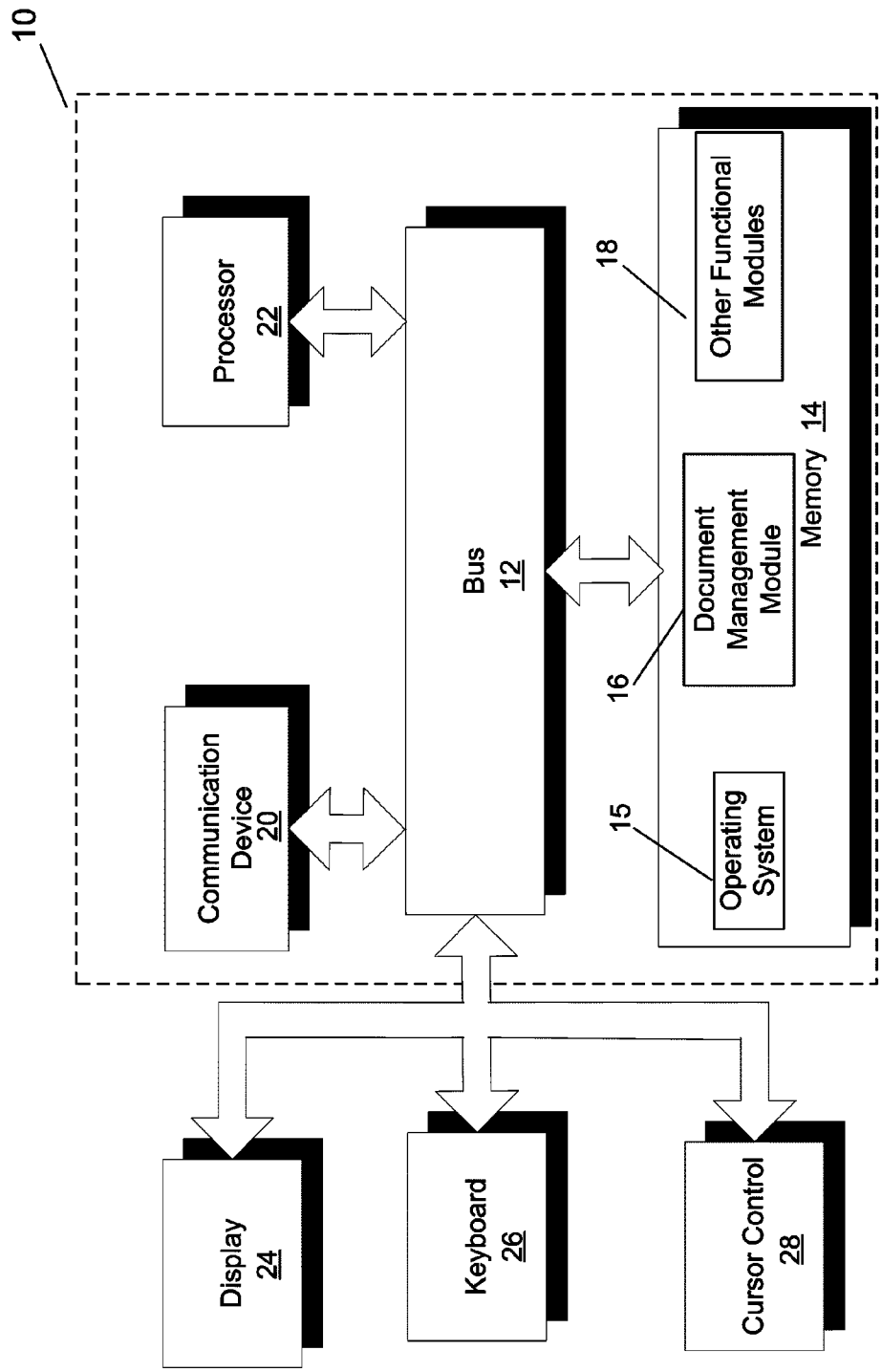
FIG. 1 illustrates a block diagram of a system that may implement an embodiment of the present invention.

FIG. 1 illustrates a block diagram of a document management system 10 that may implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. Computer-readable medium may include both volatile and nonvolatile media, removable and non-removable media, communication media, and storage media. Communication media may include computer readable instructions, data structures, program modules or other data in a modulated data signal such as a carrier wave or other transport mechanism, and may include any information delivery media. Storage media may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a document management module 16, as well as other functional modules 18. Operating system 15 can provide an operating system functionality for system 10. Document management module 16 can provide functionality for modifying a document, as will be described in more detail below. Document management module 16 can comprise a single module or any number of modules. System 10 can also be part of a larger system. Thus, system 10 can include one or more additional functional modules 18 to include the additional functionality. For example, functional modules 18 may include financial modules that are part of the "Fusion" product from Oracle Corporation.

Figure 2:
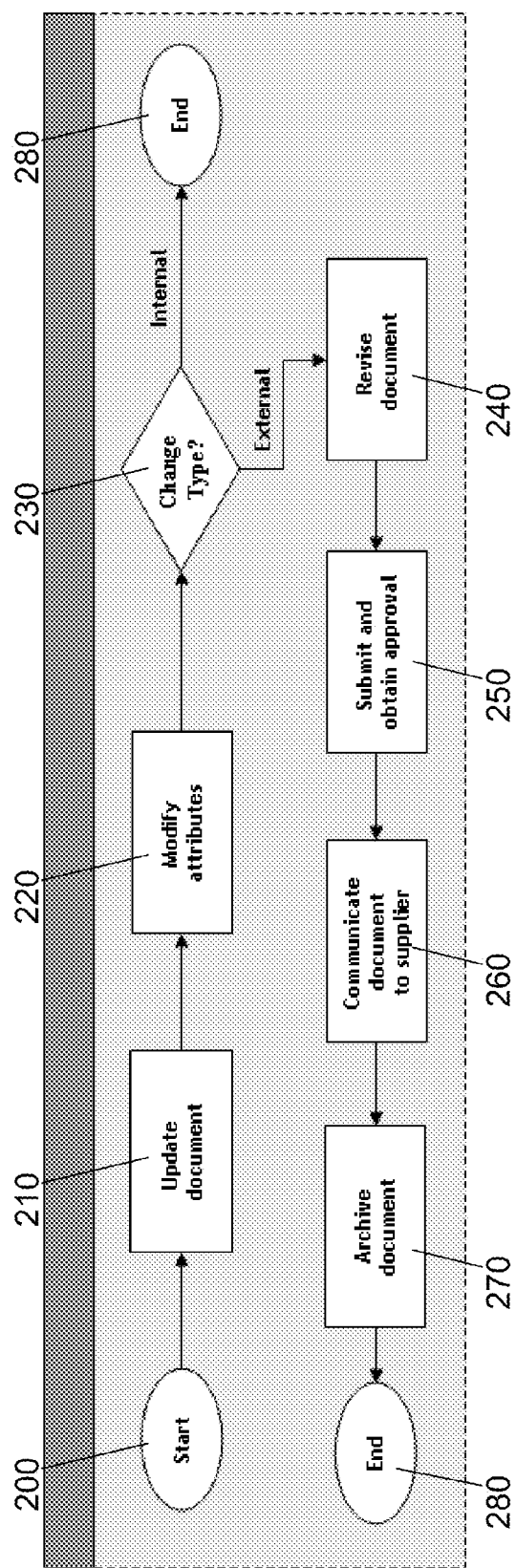
FIG. 2 illustrates a flow diagram of a document management system in accordance with the prior art.

FIG. 2 illustrates a prior art flow diagram of a typical document management system. At 200, a flow for modifying a document, such as a purchasing document begins. At 210, a user selects a document that the user wishes to modify. For example, the user performs a search for the document in a database. Once the document is found in the database, the document is selected and the attributes of the document are displayed to the user. For example, the attributes of the document are displayed to the user via a user interface.

At 220, a user modifies one or more attributes of the document. The document is modified directly, where a new attribute value overwrites a previous attribute value in the document. At 230, the document management system determines whether the change to the document is an internal change or an external change. The process for determining the type of change utilizes a list of document attributes. For example, the list of document attributes may be hard-coded into the code of the document management system, so that the document management system can compare a changed attribute with the list of document attributes. As another example, the list of document attributes may be hard-coded into a database. The document management system can read the list of document attributes from the database and compare the changed attribute with the list of document attributes. If any of the changed attributes are in the hard-coded list, then the type of change is an external change. If none of the changed attributes are in the hard-coded list, then the type of change is an internal change.

If the change to the document is an internal change, then the flow for modifying the document ends at 280. However, if the change to the document is an external change, then the flow continues at 240. At 240, a revision number attribute of the document is incremented. A revision number attribute is an attribute that indicates the current revision number of the current document. At 250, the document is submitted for internal approval by the buyer. For example, a manager of the buyer can approve of the changes to the document by the buyer. Once the buyer approves the changes to the document, the flow proceeds to 260, where the document is communicated to the supplier, so that the supplier can acknowledge the changes to the documents. At 270, the document is archived. For example, the document is saved in a database. At 280, the flow for modifying the document ends.

As can be seen, if the change to the document is an internal change (i.e., only includes changes to internal control attributes), then a history of the changes is not recorded. Instead, the document is merely modified, where the values of the internal control attributes are overwritten by new values. Thus, typical document management systems lack the ability to track document changes that only include changes to internal control attributes.

Figure 3:
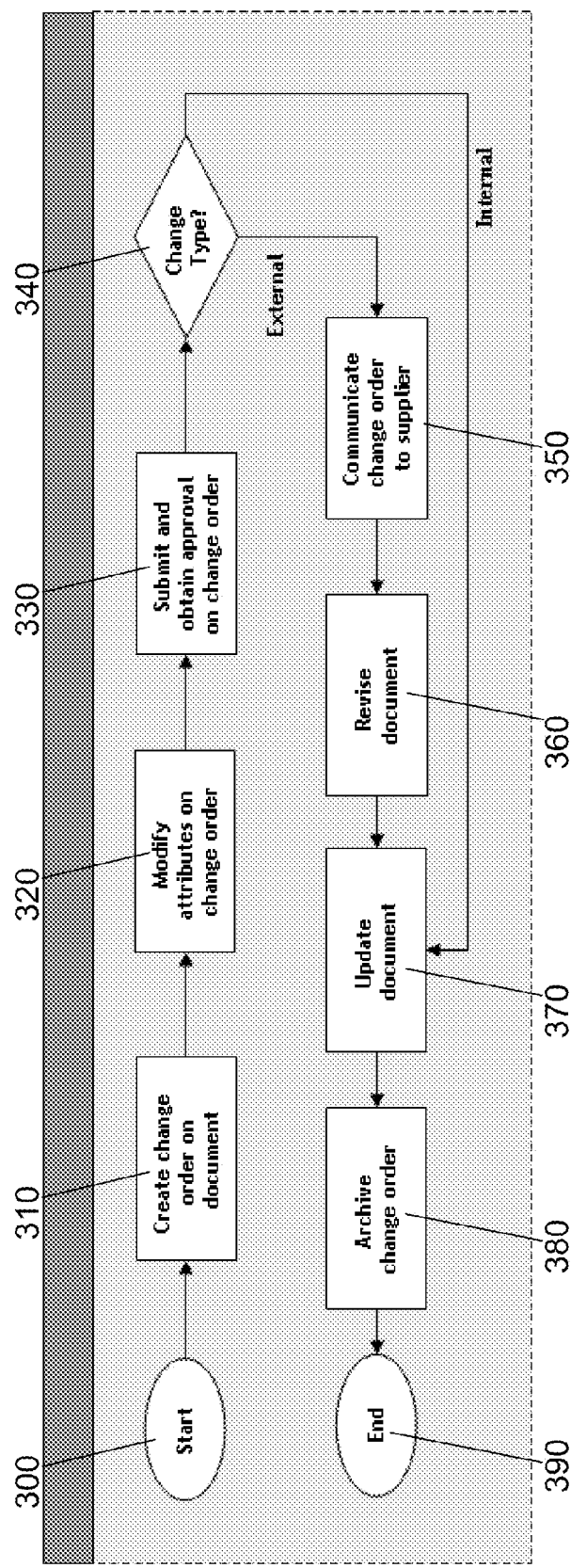
FIG. 3 illustrates a flow diagram of a document management system in accordance with one embodiment of the invention.

FIG. 3 illustrates a flow diagram of a document management system in accordance with one embodiment of the invention. In one embodiment, the functionality of the flow diagram of FIG. 3 is implemented by software stored in memory or other computer-readable or tangible media, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. Furthermore, in one embodiment, the functionality of the flow diagram of FIG. 3 is implemented by document management module 16 of FIG. 1.

At 300, a flow for modifying a document, such as a purchasing document begins. At this point in the flow, it is presumed that at least one document has been created by a document management system, and is an active document. An active document is a document that is ready for execution. For example an active purchase order is a purchasing document that is available to validate any invoice received from a supplier or available to receive against.

When a user (such as a buyer or supplier) wishes to modify a document, a user can send a request to the document management system to access a document. For example, the document management system can provide the option to perform a search for the document in a database. In this example, the document management system can receive a criterion from the user and produce a search result listing relevant documents based on the received criterion. The user can then select which document is to be modified.

There may be many reasons to modify a document. For example, a purchase order (which is a type of purchasing document) can be modified because the buyer wants to add, remove, or modify an item in the purchase order, the supplier wants to change a delivery date of the purchase order, or the supplier cannot deliver the item on the delivery date. As another example, a purchasing agreement (which is also a type of purchasing document) can be modified because the buyer wants to modify contract terms and conditions due to revised governmental laws or regulations, the supplier wants to add more lines on the purchasing agreement, or the supplier wants to increase the price of goods or services on the purchasing agreement because of inflation.

At 310, rather than allowing the user to directly modify the selected document, the document management system creates a change order which corresponds to the selected document. A change order is a copy of the document intended to capture changes to the current document. For example, a change order for a purchasing document is a copy of the original purchasing document, and includes all of the attributes and content of the original purchasing document.

At 320, the document management system allows the user to modify one or more attributes of the change order that correspond to the original document by receiving one or more attribute changes from the user and applying the attribute changes to the change order. Thus, rather than modifying the original document, the document management system modifies the corresponding change order. Therefore, the original document is unchanged until changes in the change order are approved and implemented.

At 330, the document management system submits the change order, including the modified attributes, for internal approval. For example, the document management system can send a request to a manager of a buyer to approve the changes in the change order. As previously discussed, the original document is unchanged while the document management system requests approval of the change order.

After the document management system receives approval of the change order, the flow proceeds to 340, where the document management system determines the change type of the changes to the document (i.e., whether the change to the document is an external change or an internal change). The document management system can determine the change type via a variety of mechanisms and still be within the scope of the invention. For example, in an embodiment, the document management system can determine the change type utilizing a change order template, as described in U.S. patent application Ser. No. 12/388,307, entitled "CHANGE ORDER TEMPLATE FOR PURCHASE ORDER DOCUMENT AMENDMENT," herein incorporated by reference. According to another embodiment, the document management system can determine the change type by comparing the changed attributes of the change order with a hard-coded list of document attributes as previously described. According to another embodiment, the document management system can determine the change type by determining a value of an attribute of the change order, set by the user, which indicates whether a change is an external change or an internal change. Furthermore, in other embodiments, the document management system may be configured to determine the change type using yet another mechanism and still be within the scope of the invention.

At 340, the flow can proceed in one of two different paths, depending on whether the change to the document is an external change or an internal change. If the change to the document is an external change, then the flow proceeds to 350. However, if the change to the document is an internal change, then the flow skips 350 and 360, and proceeds directly to 370. Thus, the document management system only performs the functionality of 350 and 360 if the change to the document is an external change.

At 350, the document management system communicates the change order to the supplier for acknowledgment of the changes. For example, in an embodiment, the document management system sends a request to the supplier, requesting that the supplier accept the change order, which includes the changes to the original document. In an embodiment, the document management system does not wait for the supplier to acknowledge the changes in the change order, and proceeds to 360, even if the document management system has not received an acknowledgment from the supplier. As described above, the functionality at 350 is only performed if the change type is an external change. Thus, if the change order solely includes changes to internal control attributes of the document, then the document management system does not request the supplier to acknowledge the changes to the document.

At 360, the document management system increments the revision number attribute of the original document. A revision number attribute is an attribute that indicates the current revision number of the current document. For example, in an embodiment, a first version of a document may have a revision number attribute of a value 0. In the embodiment, after the document management system has created a change order with at least one change to a supplier facing attribute, and after the document management system has requested and received approval of the change order by the buyer and requested acknowledgement of the change order by the supplier, the document management system can increment the revision number attribute from a value 0 to a value 1. This indicates that the modified version of the document is the second version of the document. As described above, the functionality at 360 is only performed if the change type is an external change. Thus, if the change order solely includes changes to internal control attributes of the document, then the document management system does not increment the revision number attribute of the original document.

At 370, the document management system updates the original document with the change order by incorporating the changed attributes in the change order into the original document. In one embodiment, the document management system replaces the values of the attributes of the original document with the new values of the attributes of the change order. In another embodiment, the document management system replaces the original document with the change order. As a result, the original document includes the new attributes values of the change order, and all changes included in the change order are incorporated into the original document. As described above, the functionality at 370 is performed regardless of whether the change type is an external change or internal change.

At 380, the document management system archives the change order. In other words, the document management system saves a copy of the change order for future retrieval by a user. For example, the change order is saved in a database. As described above, the functionality at 380 is performed regardless of whether the change type is an external change or internal change. Thus, according to an embodiment, internal changes to a document, as well as external changes, are archived for future viewing. Therefore, even if a modification to a document solely includes changes to internal control attributes, the modification to the document is archived for future viewing. At 390, the flow for modifying the document ends.

Figure 4:
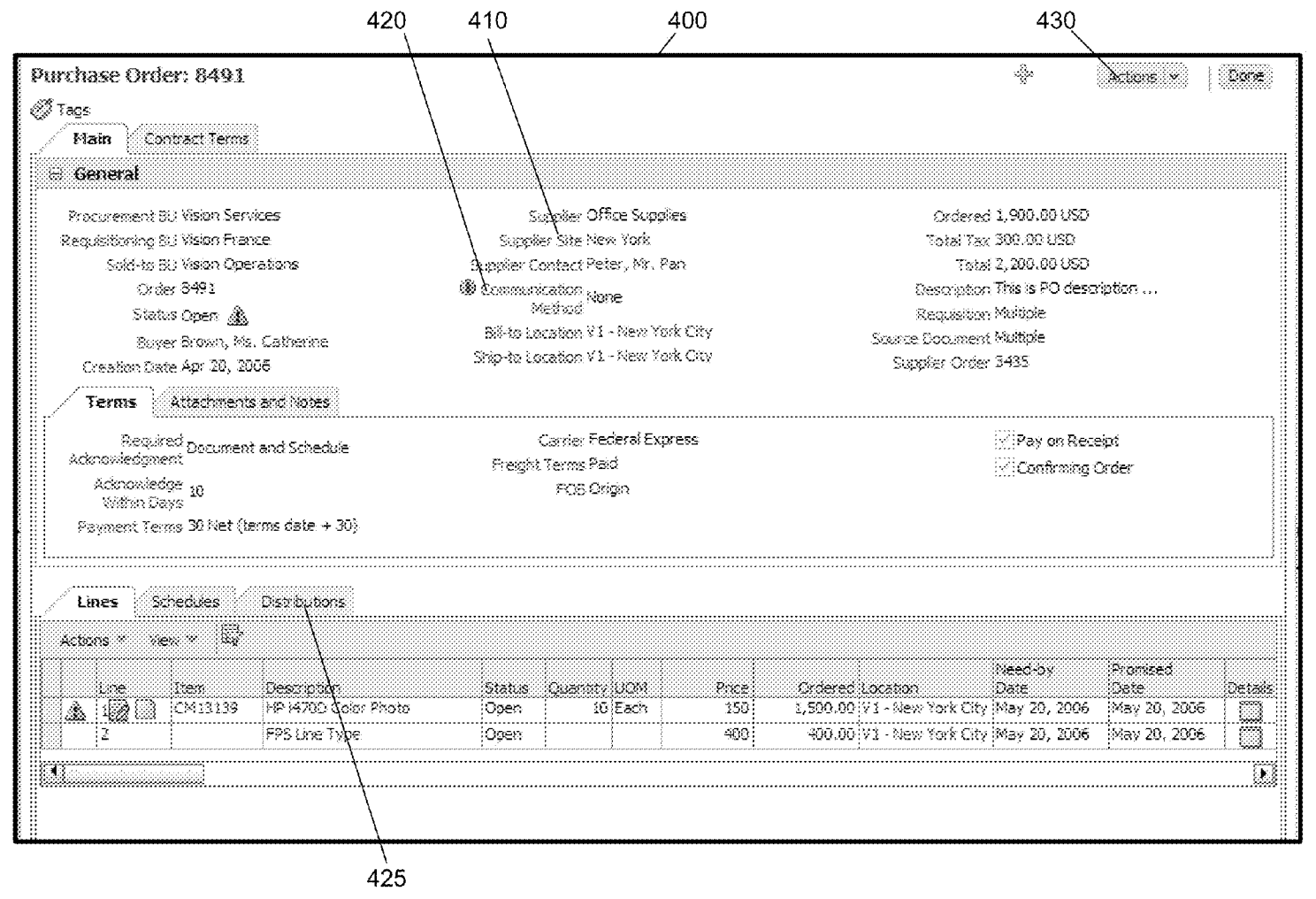

FIG. 4 illustrates a user interface 400 of a document management system which enables a buyer to view a purchasing document in accordance with one embodiment of the invention. In the illustrated embodiment, user interface 400 displays a view of a purchase order which includes internal control attributes and supplier facing attributes. For example, user interface 400 displays supplier site attribute 410, which is a supplier facing attribute, and which indicates that the supplier site is "New York." As another example, user interface 400 displays communication method attribute 420, which is an internal control attribute, and which indicates that the communication method is "None" (i.e., that there is no identified communication method for the purchase order). As another example, user interface 400 displays distributions tab 425 which, when selected, displays a set of internal control attributes (not shown). According to the embodiment, because the view displayed by user interface 400 is a buyer view, the view displays all attributes of the purchase order, including both supplier facing attributes and internal control attributes. This is because the document management system allows a buyer to view and edit all attributes of a purchasing document, including internal control attributes as well as supplier facing attributes. In the illustrated embodiment, if the buyer wishes to modify the purchase order, the buyer can cause the document management system to initiate a change order by selecting actions button 430, and selecting "Edit" from the resulting display. As an example, selecting actions button 430, may result in a drop-down menu which includes "Edit" as one of the options. In the example, the user may then select the "Edit" option. This action will cause the document management system to display a screen shown in user interface 600 of FIG. 6, which will be discussed in greater detail below. While the illustrated embodiment of FIG. 4 (and other illustrated embodiments of FIGS. 5-11) involve a purchase order, one of ordinary skill in the art would readily appreciate that any type of purchase agreement may be utilized and still be within the scope of the invention.

Figure 5:
FIG. 5 illustrates a user interface of a document management system which enables a supplier to view a purchasing document in accordance with one embodiment of the invention.

FIG. 5 illustrates a user interface 500 of a document management system which enables a supplier to view a purchasing document in accordance with one embodiment of the invention. In the illustrated embodiment, user interface 500 displays a view of the purchase order from FIG. 4. However, this view is a supplier view as opposed to a buyer view. Therefore, according to the embodiment, user interface 500 only displays supplier facing attributes of the purchase order, and does not display any internal control attributes of the purchase order. For example, similar to user interface 400, user interface 500 displays supplier site attribute 410, which is a supplier facing attribute, and which indicates that the supplier site is "New York." However, in contrast to user interface 400, user interface 500 does not display communication method attribute 420, because communication method attribute 420 is an internal control attribute. As another example, user interface 400 does not display distributions tab 425, because distributions tab 425 only displays internal control attributes. Thus, according to the embodiment, because the view displayed by user interface 500 is a supplier view, the view only displays the supplier facing attributes of the purchase order. This is because the document management system only allows a supplier to view and edit supplier facing attributes of a purchasing document. In the illustrated embodiment, if the supplier wishes to modify the purchase order, the supplier can cause the document management system to initiate a change order by selecting actions button 530, and selecting "Edit" from the resulting display. As an example, selecting actions button 530, may result in a drop-down menu which includes "Edit" as one of the options. In the example, the user may then click on the "Edit" option. This action will cause the document management system to display user interface 700 of FIG. 7, which will be discussed in greater detail below.

Figure 6:
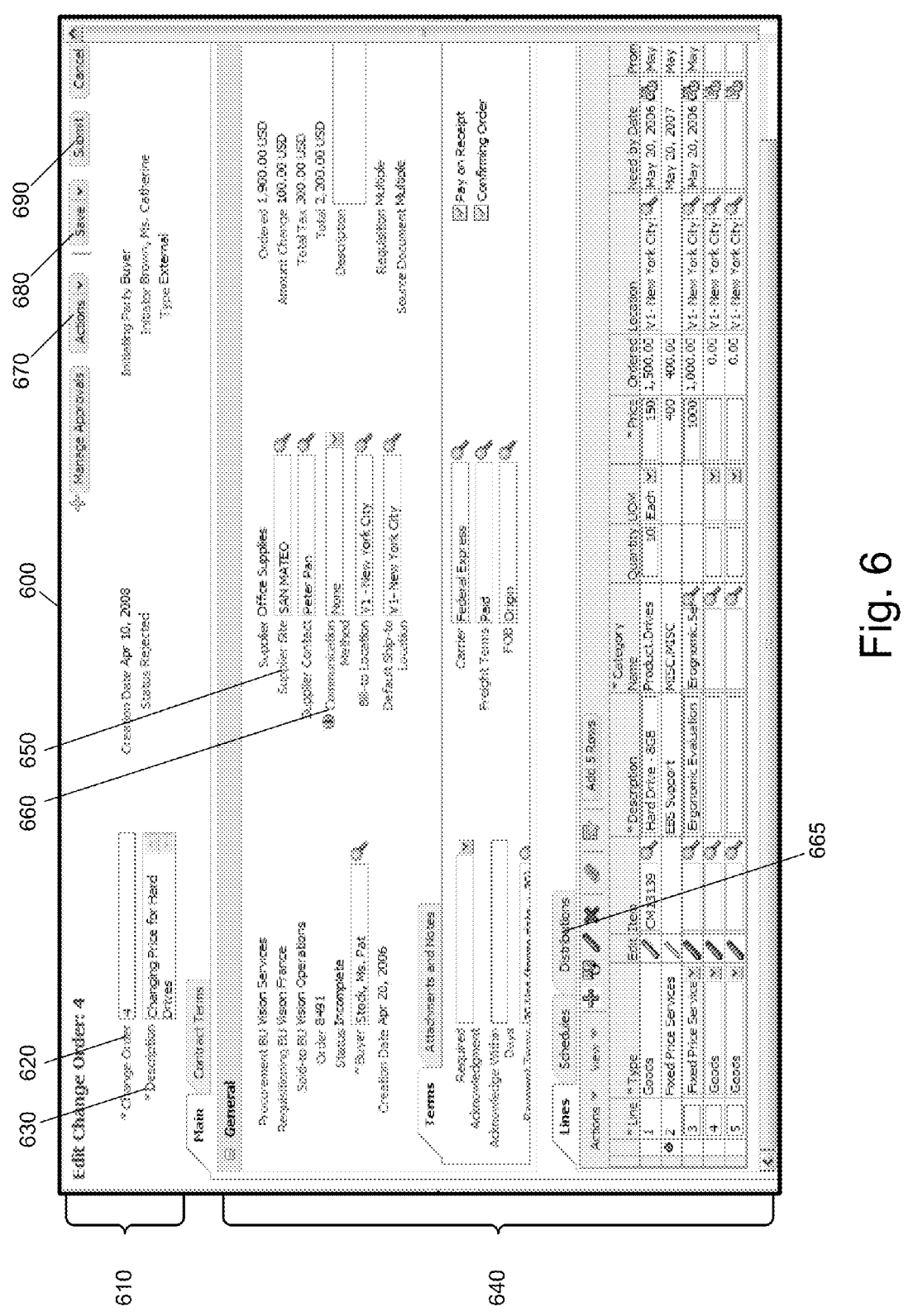

FIG. 6 illustrates a user interface 600 of a document management system which enables a buyer to edit a change order in accordance with one embodiment of the invention. As described above, in the illustrated embodiment, a screen shown in user interface 600 is displayed by the document management system, after a user selects actions button 430 of user interface 400 of FIG. 4 and selects "Edit" from the resulting display. The screen shown in user interface 600 is also displayed after the document management system creates a change order corresponding to the original purchase order, and copies the attributes and contents from the original purchase order to the change order. The screen shown in user interface 600 also enables the buyer to edit the change order, and displays all attributes of the change order, including both supplier facing attributes and internal control attributes.

In the illustrated embodiment, user interface 600 includes top region 610 and bottom region 640. Top region 610 of user interface 600 includes revision information of the change order. This information can be used to identify a specific version of a change order. For example, top region 610 includes change order number 620, and change order description 630. Change order number 620 can be used to distinguish between different versions of a change order, and change order description 630 can be used to further identify the change order with a unique description. Thus, user interface 600 enables the user to create a number and description for the change order. In the illustrated embodiment, the user has entered "4" for change order number 620 and "Changing Price for Hard Drives" for change order description 630. In an alternative embodiment, change order number 620 is derived by the document management system, rather than selected by a user. In this alternative embodiment, the document management system can derive change order number 620 using a sequence that is known in the art or provide a configurable sequence for deriving a change order number to a user that is also known in the art.

In the illustrated embodiment, bottom region 640 of user interface 600 includes the attributes of the change order. The attributes of the change order are also the attributes of the corresponding purchase order, as the change order is initially a copy of the corresponding purchase order. According to the embodiment, because user interface 600 is a buyer view, user interface 600 displays both internal control attributes and supplier facing attributes. For example, user interface 600 displays supplier site attribute 650, which is a supplier facing attribute, and which indicates that the supplier site is "SAN MATEO." As another example, user interface 600 displays communication method attribute 660, which is an internal control attribute, and which indicates that the communication method is "None" (i.e., that there is no identified communication method for the purchase order). As another example, user interface 600 displays distributions tab 665 which, when selected, displays a set of internal control attributes (not shown).

User interface 600 enables the user to modify any attribute of the change order, whether the attribute is an internal control attribute or an supplier facing attribute. For example, the user may modify supplier site attribute 650 (which is a supplier facing attribute) by overwriting the current value "SAN MATEO" with a new value, such as "New York." As another example, the user may modify communication method attribute 660 (which is an internal control attribute) by overwriting the current value "None" with a new value, such as "E-Mail." As another example, the user may modify any of the internal control attributes associated with distributions tab 665 by selecting distributions tab 665 and editing a set of internal control attributes which is displayed in user interface 600 as a result of selecting distributions tab 665 (not shown).

In the illustrated embodiment, if the buyer wishes to review the changes to the change order, the buyer can select actions button 670, and select "Review Changes" from the resulting display. As an example, selecting actions button 670, may result in a drop-down menu which includes "Review Changes" as one of the options. In the example, the user may then click on the "Review Changes" option. This action will cause the document management system to display a screen shown in user interface 1000 of FIG. 10, which will be discussed in greater detail below. After the buyer has reviewed the changes to the change order, the buyer may return to screen shown in user interface 600 and make further changes to the change order. After the buyer has made all the desired changes to the change order, the buyer may save the change order in the document management system by selecting save button 680, and may submit the change order for internal approval by selecting submit button 690.

Figure 7:
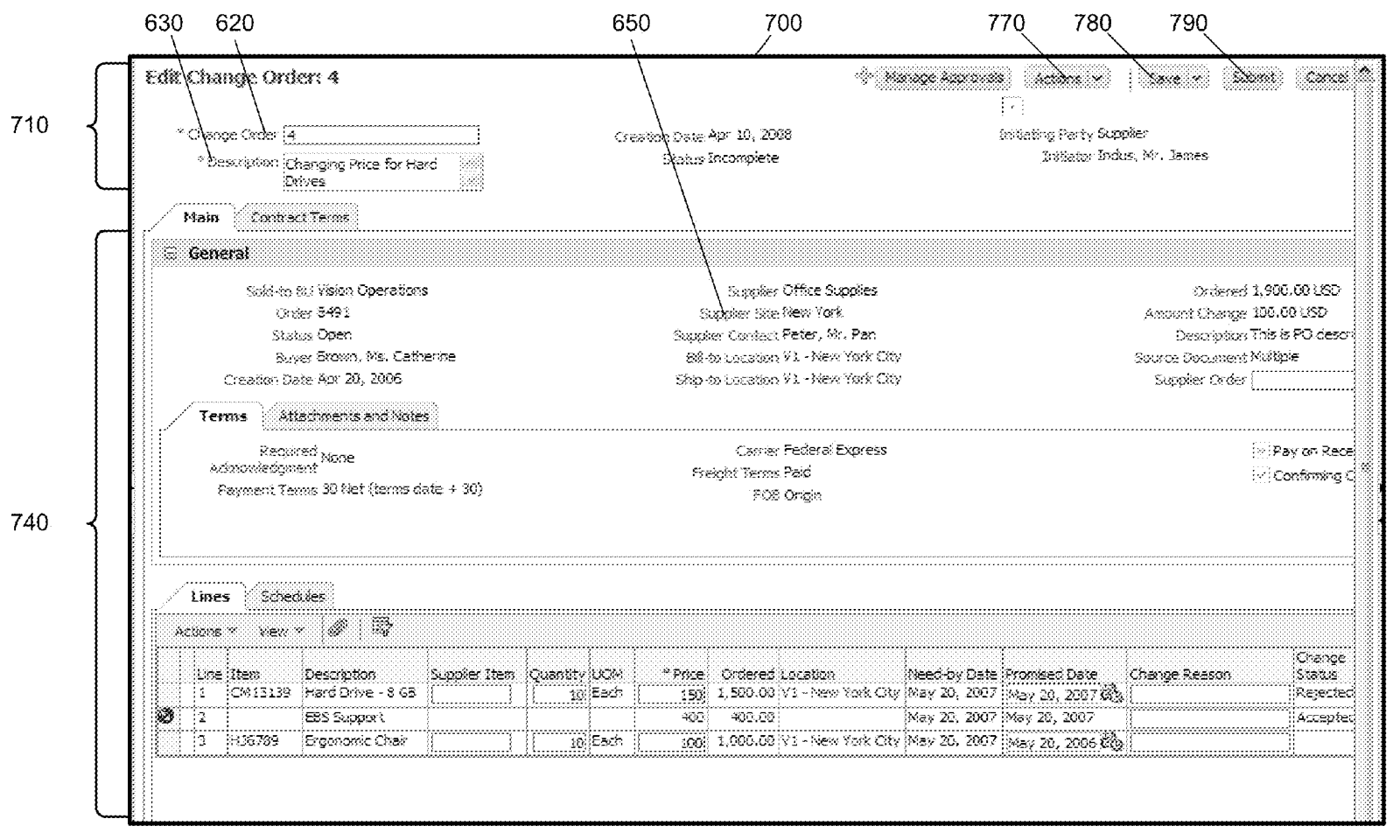

FIG. 7 illustrates a user interface 700 of a document management system which enables a supplier to edit a change order in accordance with one embodiment of the invention. As described above, in the illustrated embodiment, a screen shown in user interface 700 is displayed by the document management system, after a user selects actions button 530 of user interface 500 of FIG. 5 and selects "Edit" from the resulting display. The screen shown in user interface 700 is also displayed after the document management system creates a change order corresponding to the original purchase order, and copies the attributes and contents from the original purchase order to the change order. The screen shown in user interface 700 also enables the supplier to edit the change order. However, because a supplier is only allowed to edit supplier facing attributes of a change order, the screen shown in user interface 700 only displays supplier facing attributes of the change order and does not display internal control attributes.

The screen shown in user interface 700, showing a supplier view of the change order where only supplier facing attributes of the change order are displayed can be rendered in different ways according to different embodiments of the invention. For example, in one embodiment, in order to determine whether an attribute of the change order is a supplier facing attribute, the document management system checks a corresponding change order template, as described in U.S. patent application Ser. No. 12/388,307, entitled "CHANGE ORDER TEMPLATE FOR PURCHASE ORDER DOCUMENT AMENDMENT," In the corresponding change order template, for each attribute of the change order, a revise document flag is included. If the revise document flag for an attribute of the change order is set to a positive value (such as "Y"), then the attribute is a supplier facing attribute. If the revise document flag for an attribute of the change order is set to a negative value (such as "N"), then the attribute is an internal control attribute. In this embodiment, for each attribute of the change order, the document management system can review the revise document flag for the attribute in the change order template, and determine whether the attribute is a supplier facing attribute or internal control attribute based on the revise document flag. Accordingly, the document management system can determine whether the attribute should be displayed in user interface 700.

In another embodiment, the document management system analyzes a login type of the user in order to determine whether a user is a supplier or a buyer. If the login type of the user indicates that a user is a supplier, then the document management system selects a view of the change order to be displayed in user interface 700, where the view of the change order only includes supplier facing attributes. However, if the login type of the user indicates that a user is a buyer, then the document management system selects a view of the change order to be displayed in user interface 700. where the view of the change order includes all attributes, including both supplier facing attributes and internal control attributes.

In another embodiment, the document management system assumes that, because a change order of the original purchase order was initiated by a supplier, all attributes of the change order are supplier facing attributes. This, in this embodiment, the document management displays all attributes of the change order in user interface 700.

In the illustrated embodiment, user interface 700 includes top region 710 and bottom region 740. Top region 710 of user interface 700 includes a unique change order identifier. This information can be used to identify a specific version of a change order. For example, top region 710 includes change order number 620, and change order description 630. Change order number 620 can be used to identify the change order, and change order description 630 can be used to represent a summary of the changes being sought by the change order. Thus, user interface 700 enables the user to create a number and description for the change order. In the illustrated embodiment, the user has entered "4" for change order number 620 and "Changing Price for Hard Drives" for change order description 630. Thus, in the illustrated embodiment, top region 710 is identical to top region 610 of FIG. 6.

In the illustrated embodiment, bottom region 740 of user interface 700 includes the supplier facing attributes of the change order. The supplier facing attributes of the change order are also the supplier facing attributes of the corresponding purchase order, as the change order is a copy of the corresponding purchase order. According to the embodiment, because user interface 700 is a supplier view, user interface 700 only displays supplier facing attributes, and does not display internal control attributes. For example, user interface 700 displays supplier site attribute 650, which is a supplier facing attribute, and which indicates that the supplier site is "New York." However, in contrast to user interface 600, user interface 700 does not display communication method attribute 620, because communication method attribute 620 is an internal control attribute, and thus, the supplier is not allowed to modify communication method attribute 620. As another example, user interface 700 does not display distributions tab 665, because distribution tab 665 only includes internal control attributes, and thus, the supplier is not allowed to modify any attributes associated with distributions tab 665.

User interface 700 enables the user to modify any supplier facing attributes of the change order. For example, the user may modify supplier site attribute 650 by overwriting the current value "New York" with a new value, such as "SAN MATEO." As previously described, the user is not able to modify any internal control attributes of the change order, because user interface 700 does not display any internal control attributes.

In the illustrated embodiment, if the supplier wishes to review the changes to the change order, the supplier can select actions button 770, and select "Review Changes" from the resulting display. As an example, selecting actions button 770, may result in a drop-down menu which includes "Review Changes" as one of the options. In the example, the user may then click on the "Review Changes" option. This action will cause the document management system to display a screen shown in user interface 1100 of FIG. 11, which will be discussed in greater detail below. After the supplier has reviewed the changes to the change order, the supplier may return to screen shown in user interface 700 and make further changes to the change order. After the supplier has made all the desired changes to the change order, the supplier may save the change order in the document management system by selecting save button 780, and may submit the change order for internal approval by selecting submit button 790.

FIG. 8 illustrates a user interface 800 of a document management system which displays change history in accordance with one embodiment of the invention. In the illustrated embodiment, a screen shown in user interface 800 is displayed by the document management system, after a user selects actions button 430 of user interface 400 of FIG. 4 and selects "View Change History" from the resulting display. User interface 800 can display a change history for a specific purchasing document. In the illustrated embodiment, user interface 800 displays a change history for the purchase order shown in FIGS. 4 and 5. User interface 800 can display a view of the change history for a buyer or a supplier. In the illustrated embodiment, user interface 800 displays a view of the change history of the purchase order for a buyer. However, in an alternative embodiment (not shown) user interface 800 can display a view of the change history of the purchase order for a supplier, where the view is identified as a revision history. The revision history can show all the change orders that have caused a revision of a document to be incremented. A change order that has caused a revision of a document to be incremented is an external change order. In general, because a supplier is focused on external changes, a supplier will be more interested in the revision history view.

The change history of a purchasing document can include all change orders created for the purchasing document. In the illustrated embodiment, user interface 800 displays ten change orders for the purchase order, i.e., change orders 1-10. For each change order, user interface 800 can display information about the change order. In the illustrated embodiment, user interface 800 displays the change type of each change order (i.e., whether the change is an internal change or external change). For example, user interface identifies that change orders 3, 8, and 9 (which are highlighted in FIG. 8) are internal changes (i.e., change orders 3, 8, and 9 solely include changes to internal control attributes), and that change orders 1, 2, 4, 5, 6, 7, and 10 are external changes. In the illustrated embodiment, user interface 800 also displays the status of each change order (i.e., whether the change order has been processed). For example, user interface 800 displays the status of "Processed" for change order 1, whereas user interface 800 displays the status of "Canceled" for change order 2.

If a supplier requests to view the change history of a purchasing document, the document management system can cause a user interface to only display the external change orders, and to filter the internal change orders. For example, if a supplier requested to view the change history of the purchase order shown in FIGS. 4 and 5, the document management system can cause a user interface to display a screen similar to the screen of user interface 800, but with change orders 3, 8, and 9 (which are highlighted in FIG. 8) filtered from the view, so that only change orders 1, 2, 4, 5, 6, 7, and 10 are displayed.

In the illustrated embodiment, if the user wishes to review a specific change order displayed by user interface 800, the user can double-click the specific change order. This action will cause the document management system to display a screen shown in user interface 1000 of FIG. 10 or user interface 1100 of FIG. 11, both which will be discussed in greater detail below, depending on whether the view of user interface 800 is a buyer view or a supplier view.

FIG. 9 illustrates a user interface of a document management system which displays revision history in accordance with one embodiment of the invention. In the illustrated embodiment, a screen shown in user interface 900 is displayed by the document management system, after a user selects actions button 430 of user interface 400 of FIG. 4 and selects "View Revision History" from the resulting display. User interface 900 can display a revision history for a specific purchasing document. In the illustrated embodiment, user interface 900 displays a revision history for the purchase order shown in FIGS. 4 and 5. User interface 900 can display a view of the revision history for a buyer or a supplier.

The revision history of a purchasing document can include all revisions created for the purchasing document. In the illustrated embodiment, user interface 900 displays ten revisions for the purchase order, i.e., revisions 1-10. For each revision, user interface 900 can display information about the revision. In the illustrated embodiment, user interface 900 displays a change order associated with each revision of the purchasing order. As discussed above, the document management system only creates a new revision of a purchasing document when there is an external change (i.e., a change to at least one supplier facing attribute) that is processed by the document management system. Thus, only external change orders that have been processed by the document management system are associated with a revision. For example, user interface 900 indicates that revisions 1 and 2 are associated with change orders 1 and 2, respectively, but that revision 3 is associated with change order 4, rather than change order 3.

Figure 10:
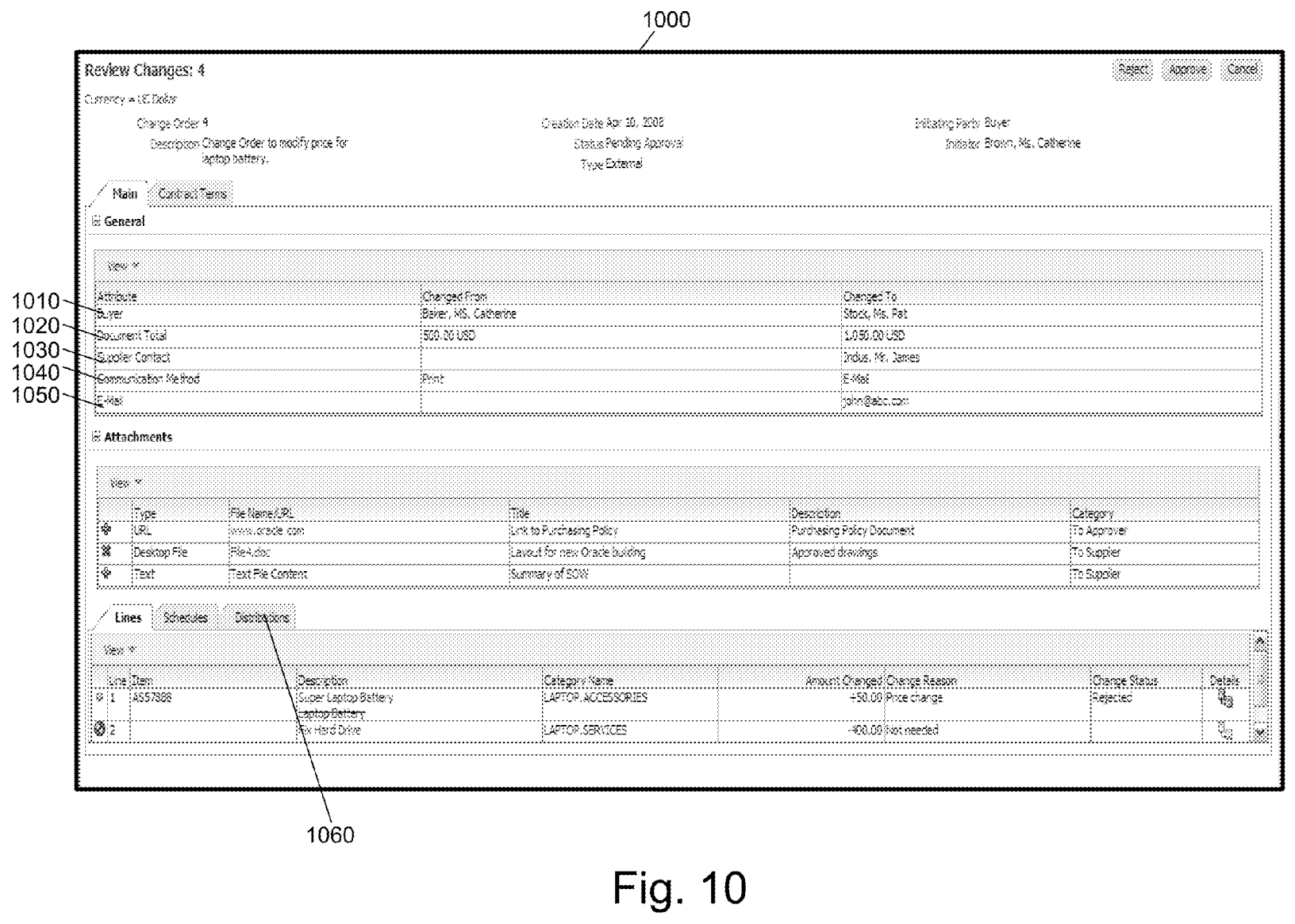

FIG. 10 illustrates a user interface of a document management system which enables a buyer to review proposed changes on a change order that corresponds to a purchasing document in accordance with one embodiment of the invention. As described above, in the illustrated embodiment, a screen shown in user interface 1000 is displayed by the document management system, after a user selects actions button 670 of user interface 600 of FIG. 6 and selects "Review Changes" from the resulting display.

User interface 1000 can enable the buyer to review changes made in the change order. More specifically, user interface 1000 can enable the buyer to review the attributes that have been changed in the change order. Because the view displayed by user interface 1000 is a buyer view, user interface 1000 can display both changes to supplier facing attributes and changes to internal control attributes. In the illustrated embodiment, user interface 1000 displays changes to buyer attribute 1010, document total attribute 1020, and supplier contract attribute 1030 (all of which are supplier facing attributes), and also displays changes to communication method attribute 1040 and e-mail attribute 1050 (all of which are internal control attributes). More specifically, user interface 1000 displays that buyer attribute 1010 was changed from "Baker, MS. Catherine" to "Stock, Ms. Pat," document total attribute 1020 was changed from "500.00 USD" to "1050.00 USD," supplier contract attribute 1030 was changed from a null value to "Indus, Mr. James," communication method attribute 1040 was changed from "Print" to "E-Mail," and e-mail attribute 1050 was changed from a null value to "john@abc.com." In addition, if a user selects distributions tab 1060, user interface 1000 displays any internal control attributes associated with distributions tab 1060 that have been changed in the change order (not shown).

Figure 11:
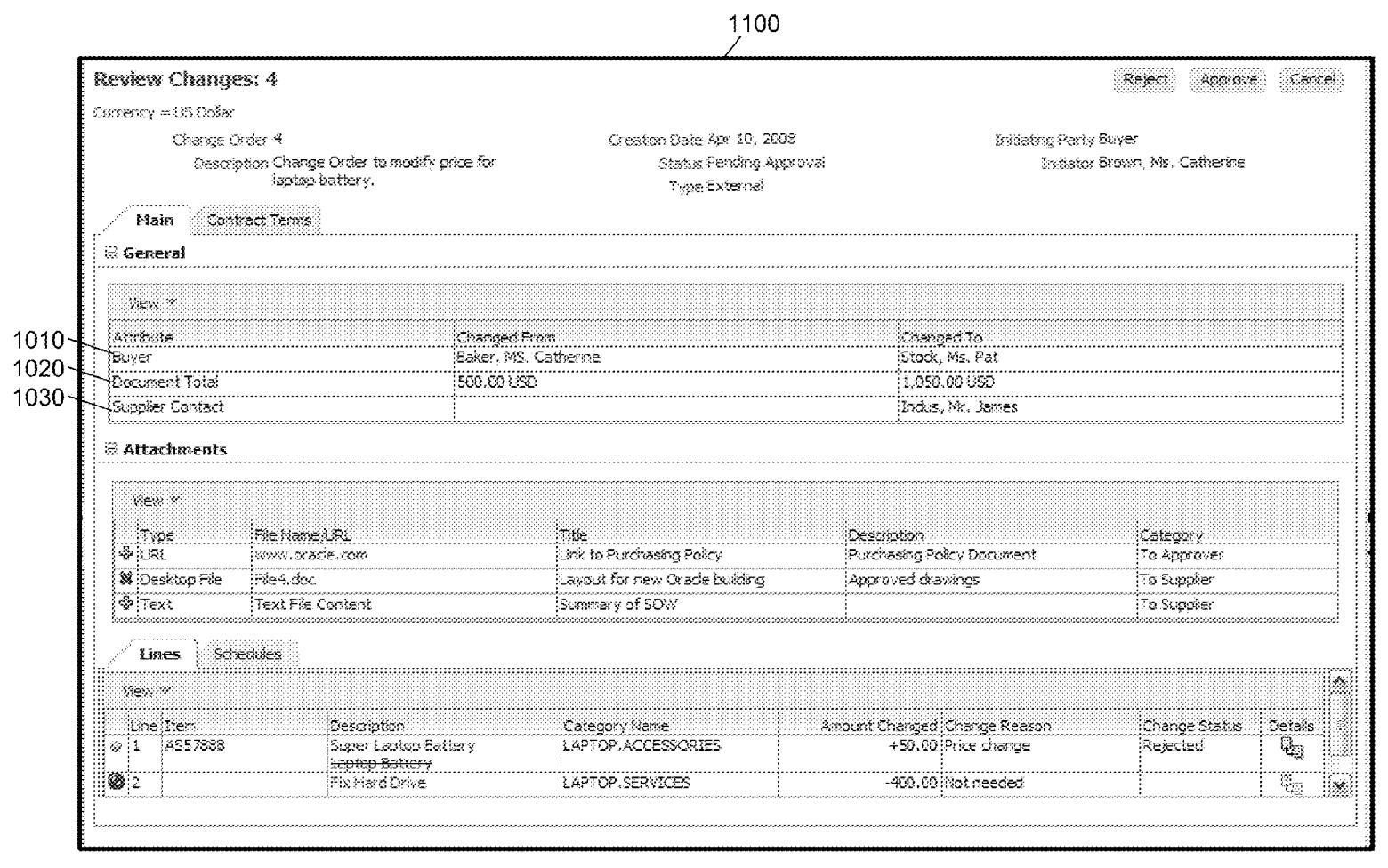

FIG. 11 illustrates a user interface of a document management system which enables a supplier to review proposed changes on a change order that corresponds to a purchasing document in accordance with one embodiment of the invention. As described above, in the illustrated embodiment, a screen shown in user interface 1100 is displayed by the document management system, after a user selects actions button 770 of user interface 700 of FIG. 7 and selects "Review Changes" from the resulting display.

User interface 1100 can enable the supplier to review external changes made in the change order. More specifically, user interface 1100 can enable the supplier to review the supplier facing attributes that have been changed in the change order. Because the view displayed by user interface 1100 is a supplier view, user interface 1100 only displays changes to supplier facing attributes, and does not display changes to internal control attributes. In the illustrated embodiment, user interface 1100 only displays changes to buyer attribute 1010, document total attribute 1020, and supplier contract attribute 1030 (all of which are supplier facing attributes). More specifically, user interface 1000 displays that buyer attribute 1010 was changed from "Baker, MS. Catherine" to "Stock, Ms. Pat," document total attribute 1020 was changed from "500.00 USD" to "1050.00 USD," and supplier contract attribute 1030 was changed from a null value to "Indus, Mr. James." Significantly, user interface 1100 does not display changes to communication method attribute 1040 and e-mail attribute 1050 (both of which are internal control attributes), because the document management system does not display internal control attributes to suppliers. In addition, user interface 1100 does not display distributions tab 1060, even if there are changes to attributes associated with distributions tab 1060, because the document management system does not display internal control attributes to suppliers.

Thus, according to an embodiment, a document management system creates a change order which corresponds to a purchasing document. Proposed changes to the purchasing document are captured on the change order rather than the purchasing document. The scope of the change captured on the change order can include changes to supplier facing attributes, changes to internal control attributes, or changes to both supplier facing attributes or internal control attributes. A change order is created whenever a purchasing document is updated, even if the scope of the change is limited to internal control attributes. When the document management system processes a change order, the document management system can automatically detect a scope of a change, and process the change order accordingly. The document management system can archive each change order created by the system, and filter a view of prior change orders, whereas a buyer can view all change orders created for a purchasing document, including the ones that only involve internal control attribute changes, and a supplier can only view changes orders that contain at least one supplier facing attribute change.

According to an embodiment, organizations are able to capture a complete audit trail of any change to a document irrespective of whether the change includes supplier facing attributes or internal control attributes or both. According to the embodiment, a historical record of all changes initiated on a document is kept. This can enable organizations to retrieve all aspects of prior change orders, such as who initiated the change order, what did the change order change, when was the change order processed, and why was the change order initiated. In situations of laws and regulations that organizations are required to adhere to, the ability to track changes to internal control attributes can be vital and necessary to mitigate risk of non-compliance.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed.

Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A computer-readable medium having instructions stored thereon that, when executed by a processor, cause the processor to implement a method, the instructions comprising:
   creating a change order for a purchasing document, wherein the change order is a copy of the purchasing document that captures changes to the purchasing document;
   modifying one or more attributes of the change order;
   submitting and receiving approval of the change order;
   determining whether a change type of the change order is internal or external, wherein the change type of the change order is external when the modifications to the one or more attributes includes a modification to at least one supplier facing attribute;
   when the change type is external, requesting acknowledgment of the change order and incrementing a revision number attribute of the purchasing document;
   updating the purchasing document with the change order by incorporating the modified one or more attributes of the change order into the purchasing document; and
   archiving the change order.

2. The computer-readable medium of claim 1, the instructions further comprising displaying the change order via an user interface.

3. The computer-readable medium of claim 2, wherein displaying the change order further comprises displaying both supplier facing attributes and internal control attributes of the change order when a user is allowed to view internal control attributes.

4. The computer-readable medium of claim 2, wherein displaying the change order further comprises displaying only supplier facing attributes when a user is not allowed to view internal control attributes.

5. The computer-readable medium of claim 2, wherein a user is enabled to edit both supplier facing attributes and internal control attributes of the change order.

6. The computer-readable medium of claim 2, wherein a user is enabled to edit only supplier facing attributes of the change order.

7. The computer-readable medium of claim 1, the instructions further comprising displaying a change history via a user interface, wherein the change history comprises one or more change orders created for the purchasing document.

8. The computer-readable medium of claim 7, wherein the change history comprises external change orders and internal change orders when a user is allowed to view internal change orders.

9. The computer-readable medium of claim 7, wherein the change history comprises only external change orders when a user is not allowed to view internal change orders.

10. The computer-readable medium of claim 1, the instructions further comprising displaying a revision history via a user interface, wherein the revision history comprises one or more revisions of the purchasing document.

11. The computer-readable medium of claim 2, the instructions further comprising displaying modified attributes of the change order via the user interface.

12. The computer-readable medium of claim 11, wherein displaying the modified attributes of the change order further comprises displaying both modified internal control attributes and modified supplier facing attributes when a user is allowed to view internal control attributes.

13. The computer-readable medium of claim 11, wherein displaying the modified attributes of the change order further comprises displaying only modified supplier facing attributes when a user is not allowed to view internal control attributes.

14. The computer-readable medium of claim 1, the instructions further comprising, where the change type is internal, updating the purchasing document with the change order and archiving the change order without requesting acknowledgment of the change order or incrementing a revision number attribute of the purchasing document.

15. A computer-implemented method, comprising:
   creating a change order for a purchasing document, wherein the change order is a copy of the purchasing document that captures changes to the purchasing document;
   modifying, by a processor, one or more attributes of the change order;
   submitting and receiving approval of the change order;
   determining whether a change type of the change order is internal or external, wherein the change type of the change order is external when the modifications to the one or more attributes includes a modification to at least one supplier facing attribute;
   when the change type is external, requesting acknowledgment of the change order and incrementing a revision number attribute of the purchasing document;
   updating the purchasing document with the change order by incorporating the modified one or more attributes of the change order into the purchasing document; and
   archiving the change order.

16. The computer-implemented method of claim 15, further comprising displaying the change order via an user interface.

17. The computer-implemented method of claim 15, further comprising displaying a change history via a user interface, wherein the change history comprises one or more change orders created for the purchasing document.

18. The computer-implemented method of claim 15, further comprising displaying a revision history via a user interface, wherein the revision history comprises one or more revisions of the purchasing document.

19. The computer-implemented method of claim 16, further comprising displaying modified attributes of the change order via the user interface.

20. An apparatus, comprising:
   a processor configured to execute one or more modules;
   a change order module configured to create a change order for a purchasing document, wherein the change order is a copy of the purchasing document that captures changes to the purchasing document;
   a modification module configured to modify one or more attributes of the change order;
   an approval module configured to submit and receive approval of the change order;
   a change type module configured to determine whether a change type of the change order is external when the modifications to the one or more attributes includes a modification to at least one supplier facing attribute;
   an acknowledgment module configured to, when the change type is external, request acknowledgment of the change order and increment a revision number attribute of the purchasing document;
   an update module configured to update the purchasing document with the change order by incorporating the modified one or more attributes of the change order into the purchasing document; and an archival module configured to archive the change order.

21. The apparatus of claim 20, further comprising a user interface configured to display the change order.

22. The apparatus of claim 20, further comprising a user interface configured to display a change history, wherein the change history comprises one or more change orders created for the purchasing document.

23. The apparatus of claim 20, further comprising a user interface configured to display a revision history, wherein the revision history comprises one or more revisions of the purchasing document.

24. The apparatus of claim 21, wherein the user interface is further configured to displaying modified attributes of the change order.

* * * * *

UNITED STATES PATENT AND TRADEMARK OFFICE
CERTIFICATE OF CORRECTION

| | | |
|---|---|---|
| PATENT NO. | : 8,209,244 B2 | |
| APPLICATION NO. | : 12/707415 | |
| DATED | : June 26, 2012 | |
| INVENTOR(S) | : Nambiar et al. | |

It is certified that error appears in the above-identified patent and that said Letters Patent is hereby corrected as shown below:

In column 10, line 56, delete "700. where" and insert -- 700, where --, therefor.

Signed and Sealed this
Twenty-fifth Day of September, 2012

David J. Kappos
*Director of the United States Patent and Trademark Office*